United States Patent
Brittain et al.

[11] Patent Number: 6,072,498
[45] Date of Patent: Jun. 6, 2000

[54] USER SELECTABLE ADAPTIVE DEGRADATION FOR INTERACTIVE COMPUTER RENDERING SYSTEM

[75] Inventors: Donald Lee Brittain, Santa Barbara, Calif.; Rolf Walter Berteig, Seattle, Wash.; Daniel David Silva, San Rafael, Calif.; Thomas Dene Hudson, Port Washington, Wis.; Gary S. Yost, San Francisco, Calif.

[73] Assignee: AutoDesk, Inc., San Rafael, Calif.

[21] Appl. No.: 08/903,827

[22] Filed: Jul. 31, 1997

Related U.S. Application Data

[60] Provisional application No. 60/025,117, Aug. 2, 1996.

[51] Int. Cl.[7] .................................................. G06T 11/00
[52] U.S. Cl. .......................................................... 345/428
[58] Field of Search .................................. 345/428, 429, 345/473, 474, 420, 475

[56] References Cited

U.S. PATENT DOCUMENTS

| | | |
|---|---|---|
| 4,688,181 | 8/1987 | Cottrell et al. . |
| 5,384,908 | 1/1995 | Mackinlay et al. ..................... 345/475 |
| 5,894,308 | 4/1999 | Isaacs ...................................... 345/420 |

*Primary Examiner*—Mark R. Powell
*Assistant Examiner*—Thu Nguyen
*Attorney, Agent, or Firm*—McDermott, Will & Emery

[57] ABSTRACT

A system to permit a designer to select the minimum scene refresh rate or animation redraw rate acceptable by the designer. The system also incorporates a selection of presentation methods for the three-dimensional objects in a scene, arranged in decreasing fidelity, and consequently in computational complexity, as fall back positions for the general rendering technique. Using the designer's selected refresh rate as a target, the system attempts to use the highest quality rendering technique selected by the designer. If the computational complexity of the scene causes the refresh rate of the scene to fall below the minimum acceptable level selected by the designer, the system selects the next lower rendering option selected by the designer, thus degrading the presentation quality of the scene and simultaneously reducing the computational complexity of the task.

19 Claims, 17 Drawing Sheets

1. Initialize Adaptive Degradation
    1. Set Rendering Parameters
        (1) Set primary rendering level
        (2) Set rendering options
    2. Set Degradation Parameters
        (1) Set Target playback frame rate
        (2) Set reset on Mouse Up
        (3) Set Show Rebuild Cursor
    3. Set interrupt Parameters
        (1) Update Time
        (2) Interrupt Time
    4. Set Degradation Options
        (1) Active Window
        (2) General Degradation
2. Render Objects in Scene
    1. Set current rendering level to Primary Rendering Level
    2. Reset Rendering Interval Timer
    3. Reset Interrupt Timer
    4. While (Objects remain to be rendered)
        (1) Render next portion of the current object at current rendering level
        (2) Calculate actual playback frame rate
        (3) Disable Mouse Down Events
        (4) If Frame Playback frame rate is less than target playback frame rate
        (5) WEND

FIG. 6

USER SELECTABLE ADAPTIVE DEGRADATION FOR INTERACTIVE COMPUTER RENDERING SYSTEM

RELATED APPLICATIONS

This application claims the benefit of U.S. provisional patent application Ser. No. 60/025,117, entitled, "Three Dimensional Modeling and Animation System," filed Aug. 2, 1996, by inventors Rolf Walter Berteig, Daniel David Silva, Donald Lee Brittain, Thomas Dene Hudson, and Gary S. Yost, which is incorporated herein by reference.

COPYRIGHT DISCLAIMER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF INVENTION

The advances in Personal Computer ("PC") technology have made possible the introduction of relatively inexpensive workstations for word processing, accounting, graphical design and other similar applications which previously required dedicated use of PC-Based Workstations. Visualization of three dimensional objects set in three-dimensional space has traditionally been hindered by the demands placed by existing software on the computers. The complex mathematical operations required for correctly drawing and rendering three-dimensional objects including hidden surface removal, application of texture, lighting, shadows, and animating the three-dimensional objects make heavy demands on the PCs used for this purpose. Typically, the PC-based systems were designed to defer most of the detailed rendering until after the design was complete. Although this compromise improved the performance of the systems, while designing the scene, the designer was not able to view a substantially accurate representation of the final scene.

In the past, typically only dedicated high-performance graphical workstations or super computers were capable of performing the complex and numerous computations associated with rendering three-dimensional objects while the designer was interacting with the objects in the scene. Less capable systems typically restricted the designer to manipulating wire-frame, or other simplified renditions of three-dimensional objects while editing the scene, and postponing the final rendering of the objects until after the scene has been composed.

This approach has the drawback of preventing the designer from appreciating the full impact of the changes made during the design of the scene. The designer is therefore forced to manipulate wire-frame representations or other simplified renditions of the objects in the scene, render the scene, review the details, and return to the wire-frame or simplified rendition for making adjustments to the scene based on the rendered view. This interactive approach requires many iterations between the wire-frame or simple renditions of the scene and the rendered view, forcing the designer to anticipate how the scene would appear once it is fully rendered without the benefit of actually seeing the objects in their final rendered form.

Another disadvantage of the typical interactive approach is that the designer cannot select the level of detail associated with each stage of the operation according to the designer's requirements.

It is therefore the object of this invention to maximize the performance of a three-dimensional design and rendering system by enabling the designer to select the trade-off between rendering speed and image quality based on the designer's requirements and the performance of the system available.

SUMMARY OF THE INVENTION

The adaptive degradation system of the present invention when incorporated into a three-dimensional design and rendering system, running on personal computers or other workstations, permits the designer to select the minimum scene refresh rate or animation redraw rate acceptable by the designer. The system also incorporates a selection of presentation methods for the three-dimensional objects in a scene, arranged in decreasing fidelity, and consequently in computational complexity, as fall back positions for the general rendering technique. Using the designer's selected refresh rate as a target, the system attempts to use the highest quality rendering technique selected by the designer. If the computational complexity of the scene causes the refresh rate of the scene to fall below the minimum acceptable level selected by the designer, the system selects the next lower rendering option selected by the designer, thus degrading the presentation quality of the scene and simultaneously reducing the computational complexity of the task.

If the designated refresh rate can be maintained at that level of degradation, the system continues to use that degradation level until the computation load on the system is lightened to the level where the higher quality rendering could be attained without reducing the refresh rate of the scene below the level designated by the designer. If, however, the user has selected more than one degradation option and reducing the interim quality of the scene to the first degradation option is not sufficient to maintain the frame rate designated by the designer, the system automatically reduces the degradation to the second and subsequent rendering options until the refresh rate selected by the designer is attained or lowest level of degradation of the rendering selected by the designer is selected by the system.

The automatic tradeoff between the scene refresh rate and rendering complexity will make it possible to maximize the performance of the overall system on any given computational platform.

These and other objects, features and advantages of the invention will be apparent from the following description which will be read in light of the accompanying drawings in which the corresponding reference numerals refer to corresponding parts throughout several views.

BRIEF DESCRIPTION OF THE DRAWINGS

FIG. 4a shows a fully rendered scene containing multiple objects;

FIG. 4b shows a single object from the scene selected for manipulation by the user;

FIG. 4c shows the selected object being manipulated by the user causing a degradation according to the option selected by the user of the system; and FIG. 4d shows the termination of the manipulation of the objects by the user returning the scene to a fully rendered state.

FIG. 5a illustrates a scene containing multiple objects fully rendered;

FIG. 5b shows a single object being selected by the user for manipulation;

FIG. 5c shows the manipulation of the object causing first level of degradation according to the option selected by the designer;

FIG. 5d illustrates further manipulation of the same object causing a second degradation to a lower level of rendering according to the option set by the designer; and FIG. 5e illustrates the result of the termination of the manipulation of the selected object by the designer, causing the scene to be fully rendered once again.

FIG. 6 is a high level pseudo-code sequence illustrating the adaptive degradations system of the current invention.

DESCRIPTION OF THE PREFERRED EMBODIMENT

One embodiment of the invention includes a PC-Based system, such as an IBM compatible personal computer or a Macintosh™ computer available from Apple Computer, Inc. of Cupertino, Calif.

Figure 1B:
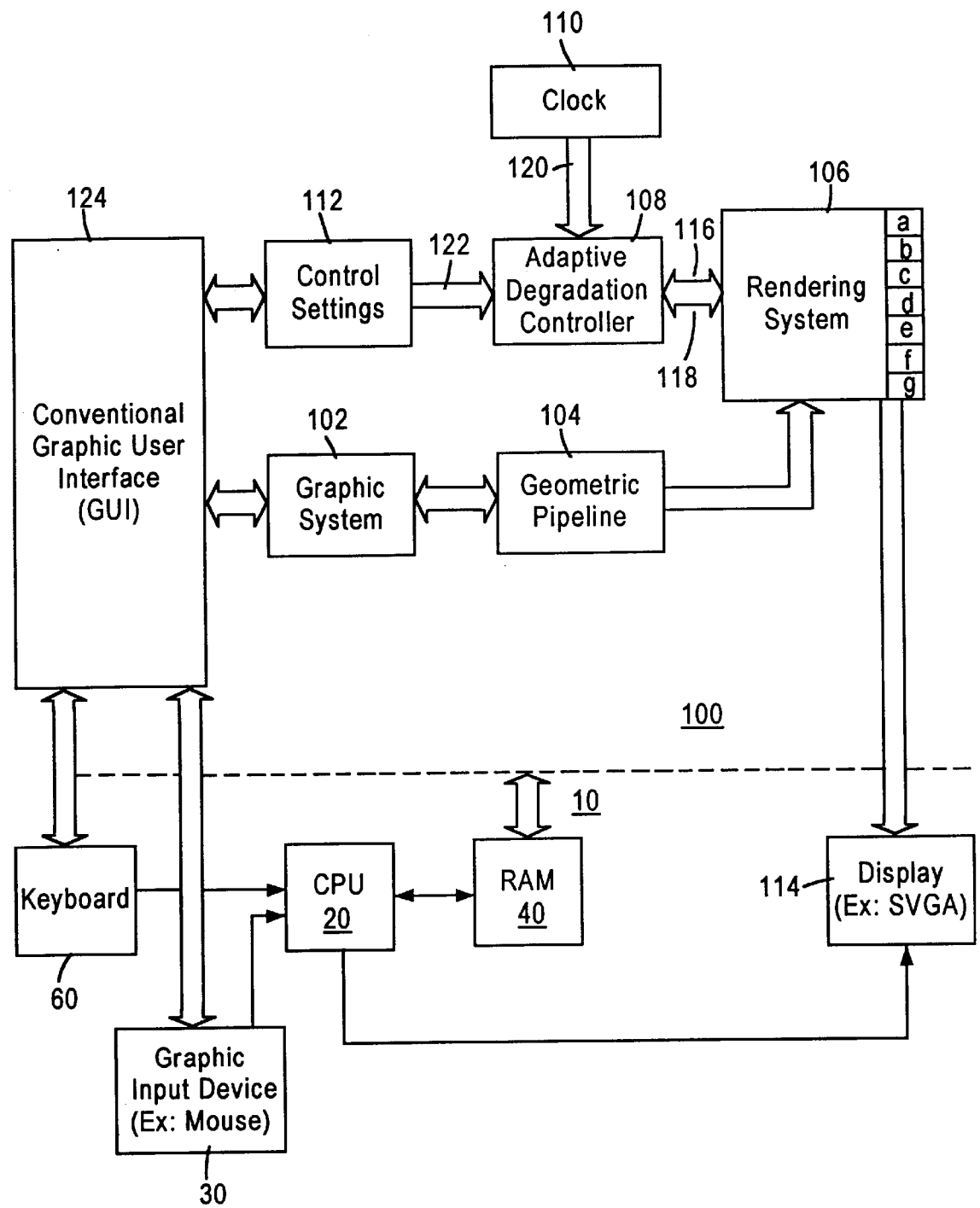
FIG. 1b is a high-level block diagram showing the rendering sequence used by the system which incorporates this invention.

Referring to FIG. 1b, the overall structure of the adaptive rendering system 100 can be seen. During operation, system 100 is loaded in the Random Access Memory 40 of the computer system 10. Computer system 10 includes one or more Central Processor Units (CPU) 20. Typically the CPU 20 is a Pentium® processor manufactured by Intel Corporation, however, the adaptive degradation system of this invention may be implemented on any general purpose computer system.

The user operates system 100 via keyboard 30 and graphic input device 30, typically a mouse or digitizing tablet. System 100 includes graphic system user interface 102, geometric pipeline 104, rendering system 106, degradation controller 108, clock 110, user interface 124, controller settings 12, and a display 114.

User interface 124 is a conventional Graphical User Interface that permits the user to enter commands and data to the graphic system 102 via keyboard 30 and graphical input device 60. Graphic system 102 allows the user to enter and modify two or three dimensional scenes containing one or more two or three dimensional objects. Graphic system 102 is coupled to geometric pipeline 104 which converts the high level description of the objects specified by the user to a series of vertexes describing, in three-dimensional space, the object specified by the user as well as any transformations that are applied to the object by the user. Geometric pipeline 104 also generates additional information needed to correctly represent each object, such as a list of connected vertexes, the texture map of the object, the surface normals for each face of the object and a three-dimensional bounding box of the object.

The output of the geometric pipeline for each object in the scene is sent to rendering system 106 which calculates the correct two dimensional screen representation of the three-dimensional vertexes for each object for display on computer display 114. The process of calculating the correct two dimensional screen representation of the three dimensional scene entered by the user is called "rendering the scene" or "rendering". The scene is updated continuously to permit the user to observe the effects of any changes introduced into the scenes by the user. The changes may include translations of the one or more selected objects in the scene, modification of one or more objects in the scene, translation of lighting sources and light types and camera position in the scene, the introduction of atmospheric elements such as fog, addition or modification of materials and textures, etc. Each update of the complete scene is called a "frame". The number of frames generated per second is the "refresh frame rate" or "frame rate" of the system 100.

Rendering system 106 contains a plurality of rendering subsystems such as subsystems 106a through 106g. Each rendering subsystem receives the vertexes received by rendering system 106 and generates a representation having a different level of detail. For example 106a generates a three-dimensional bounding box enclosing the vertexes; 106b generates a wireframe image of the vertexes, 106c generates a wireframe image of the vertexes with lighting highlights, 106d generates a faceted solid representation of the vertexes, 106e generates a faceted solid representation of the vertexes with lighting highlights, 106f generates a smooth solid representation of the vertexes; and 106g generates a smooth solid representation of the vertexes with highlights added to show the effect of lighting on the structure. Typically only one subsystem is used to render the vertexes sent to the rendering system 106 by geometric pipeline 104. The rendering subsystem is selected through the rendering selection input 116. The two-dimensional screen representation generated by rendering system 106 is sent to the computer display 114. Rendering system 106 uses as much of the information provided by geometric pipeline 104 as possible to avoid duplicate calculations. For example, when the geometric pipeline 104 calculates a three dimensional bounding box for an object, rendering system 106 would select a rendering subsystem that only displays the bounding box calculated by the geometric pipeline without re-computing the correct boundaries of the bounding box.

When the rendering process for an object begins and ends the rendering system notifies the Adaptive Degradation controller 108 via rendering signal 118. Adaptive degradation controller 108 determines the refresh frame rate for the object being rendered using the rendering signal 118 and clock input 120, connected to system clock 110. The user selects the options for the operation for the adaptive degradation using control settings 112. The options are communicated to the adaptive degradation controller 108 via options input line 122. Adaptive degradation controller 108, selects the rendering subsystem (106a through 106g) to be used by the rendering system for the current vertexes via rendering option control line 116.

Figure 2A:
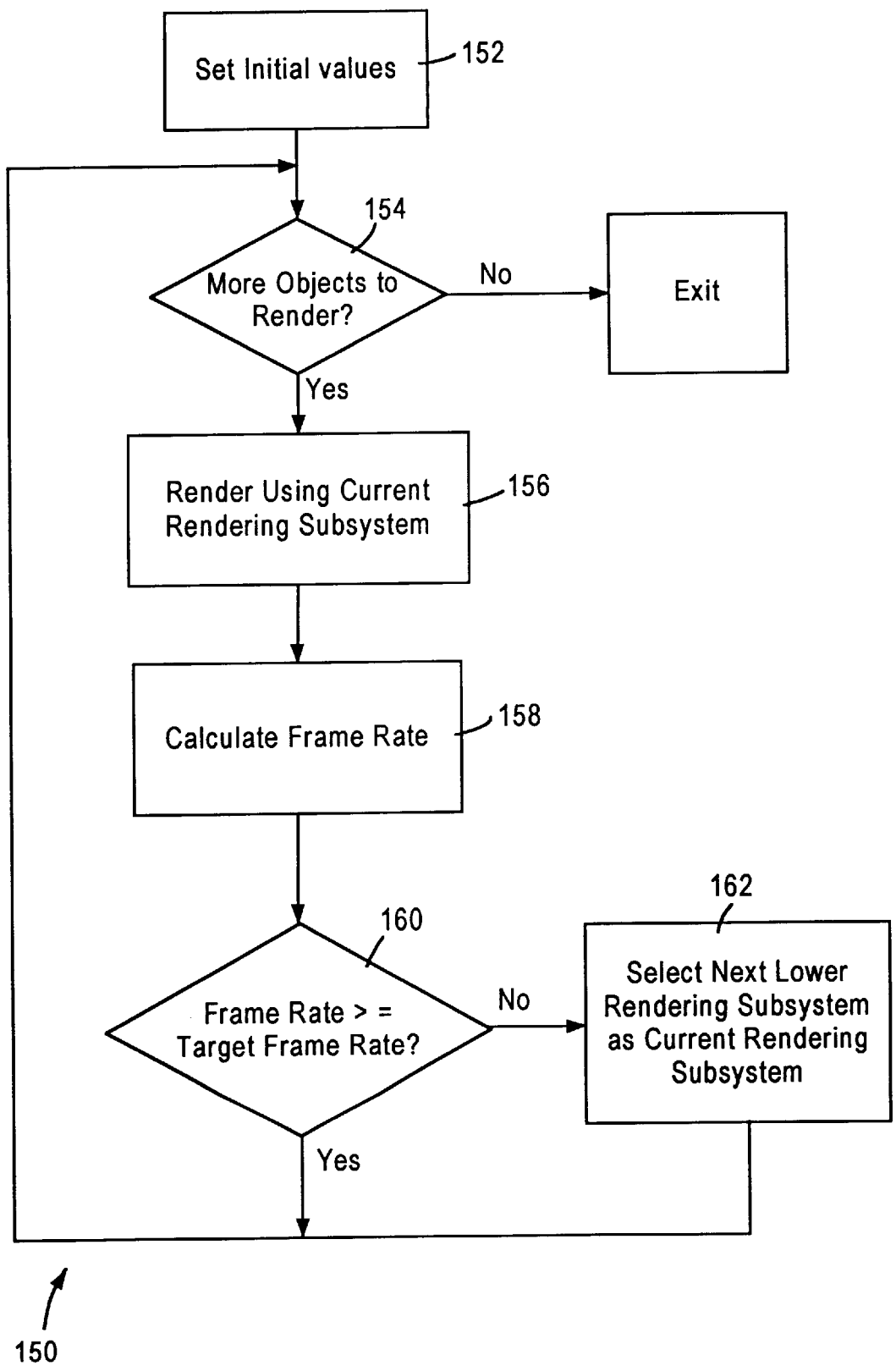
FIGS. 2a–2c are flowcharts showing the operation of the adaptive degradation system of the present invention.

The operation of the adaptive degradation system 100 can be seen in flowchart 150 in FIG. 2a. System 100 is initialized with the values selected by the user (as described in more detail below in connection with FIG. 3). System 100 also sets the current rendering selection to the value specified as the general rendering option (step 152). In step 154 system 100 determines if any objects remain to be rendered. If no objects remain the process exits. If objects remain to be rendered, system 100 proceeds to step 156 and renders the object using the current rendering selection. System 100 calculates the refresh frame rate in step 158. In step 160, the refresh frame rate is compared with a threshold frame rate specified by the user (as described in more detail below in connection with FIG. 3). If the refresh frame rate falls below the threshold frame rate specified by the user, the adaptive degradation controller 108 resets the current rendering option to the next rendering subsystem (106a–106g) which has a lower computational complexity and is specified by the user in step 152.

Figure 2B:
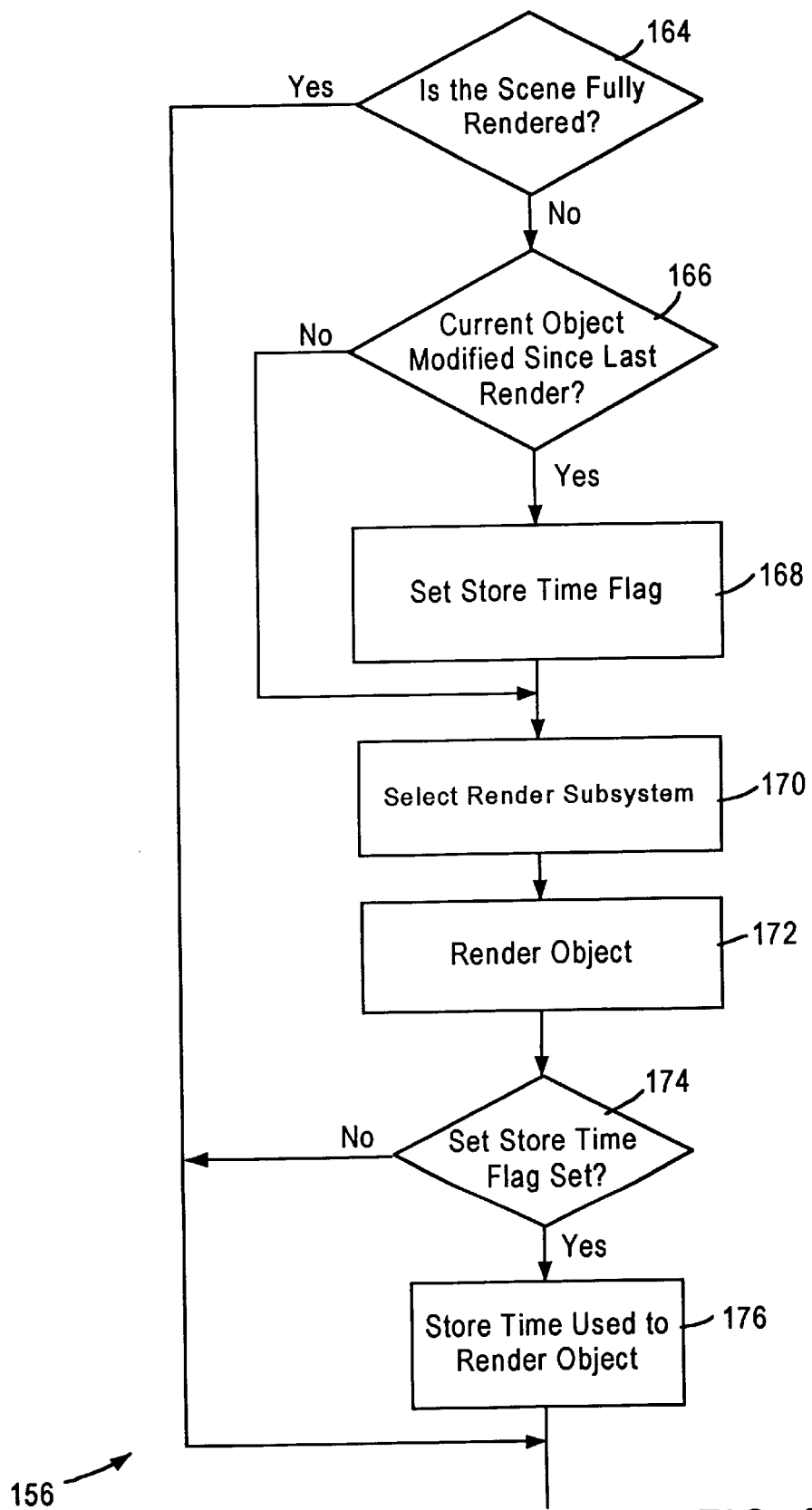

The operation of the rendering step 156 can be seen in flowchart 156 in FIG. 2b. The rendering system checks the scene to determine if the entire scene has been rendered in step 164. If the scene is completely rendered, step 156 terminates. If objects remain to be rendered, the rendering system determines if any objects have been modified since they were last rendered, or if they are no longer selected by the user, in step 166. The system stores the rendering time for each object to assist in predicting the frame rate for the system. Modifying any object, or changing the current selection of objects invalidates the stored rendering time for the object, and the rendering time required for that object must be measured anew. If the object has been modified, or the selection changed by the user, a changed object flag is set in step 168. In step 170, the appropriate rendering subsystem is selected based on selection signal 116, and the object is rendered in step 172. The changed object flag is checked in step 174. If the flag is set, the time to render the object is stored in step 176.

Figure 2C:
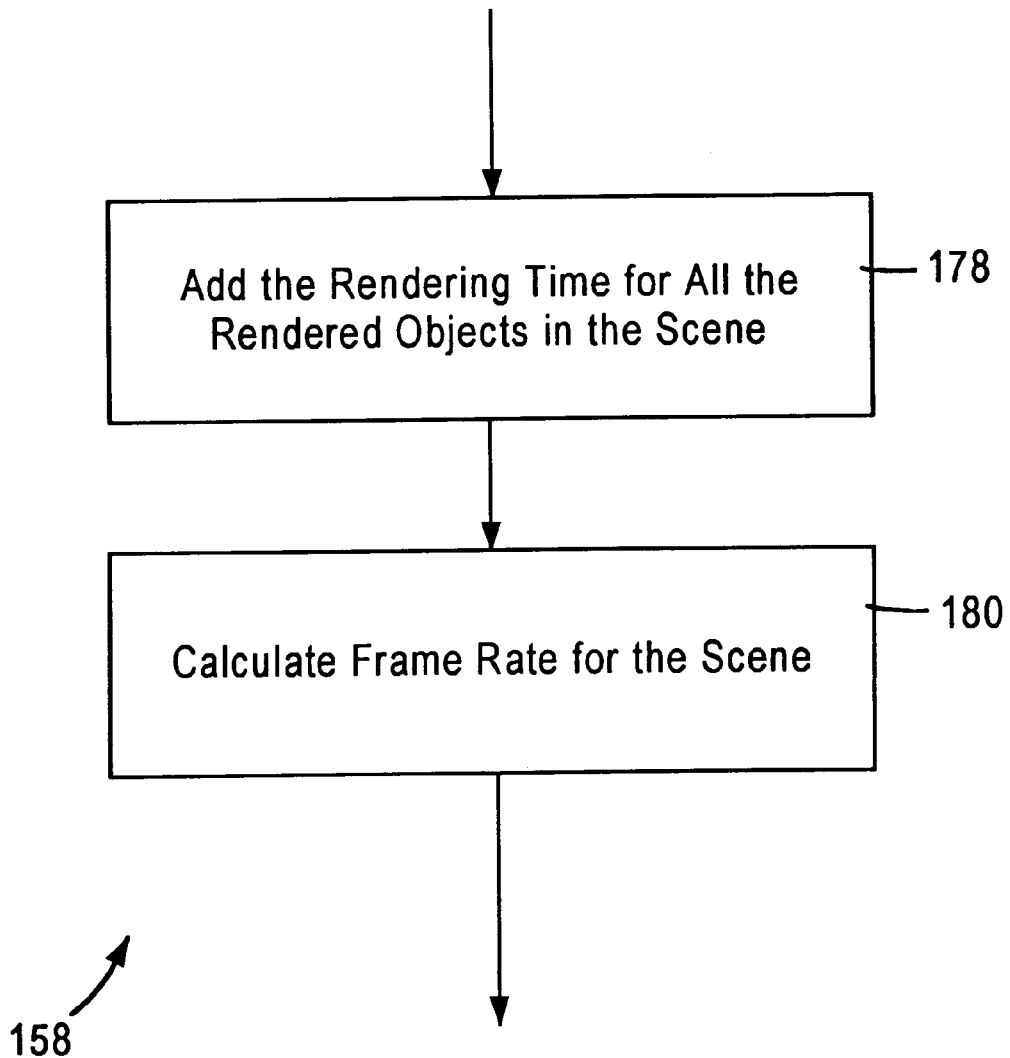

The operation of the frame rate calculation step 158 can be seen in flowchart 158 in FIG. 2c. The rendering time for each remaining object in the scene is summed in step 178. The effective frame rate of the scene is calculated in step 180. Using the previous rendering times for each object, the system can predict the frame rate of the scene and reduce the rendering quality of the remaining objects in the scene in attempting to maintain the frame rate specified by the user. When the adaptive degradation system of the present invention is used in a graphic system with both active and non-active viewports (as shown in detail in FIGS. 3 through 5) typically, the user focuses on the active viewport for editing and viewing the scene. Preferably, the active viewport is rendered first to permit it to use the majority of the time if necessary. This approach permits the active viewport to be rendered using the highest practical rendering quality to assist the user in better visualizing the scene. The non-active viewports would degrade more than the active viewport and the time available is allocated preferentially to the active viewport.

Figure 2D:
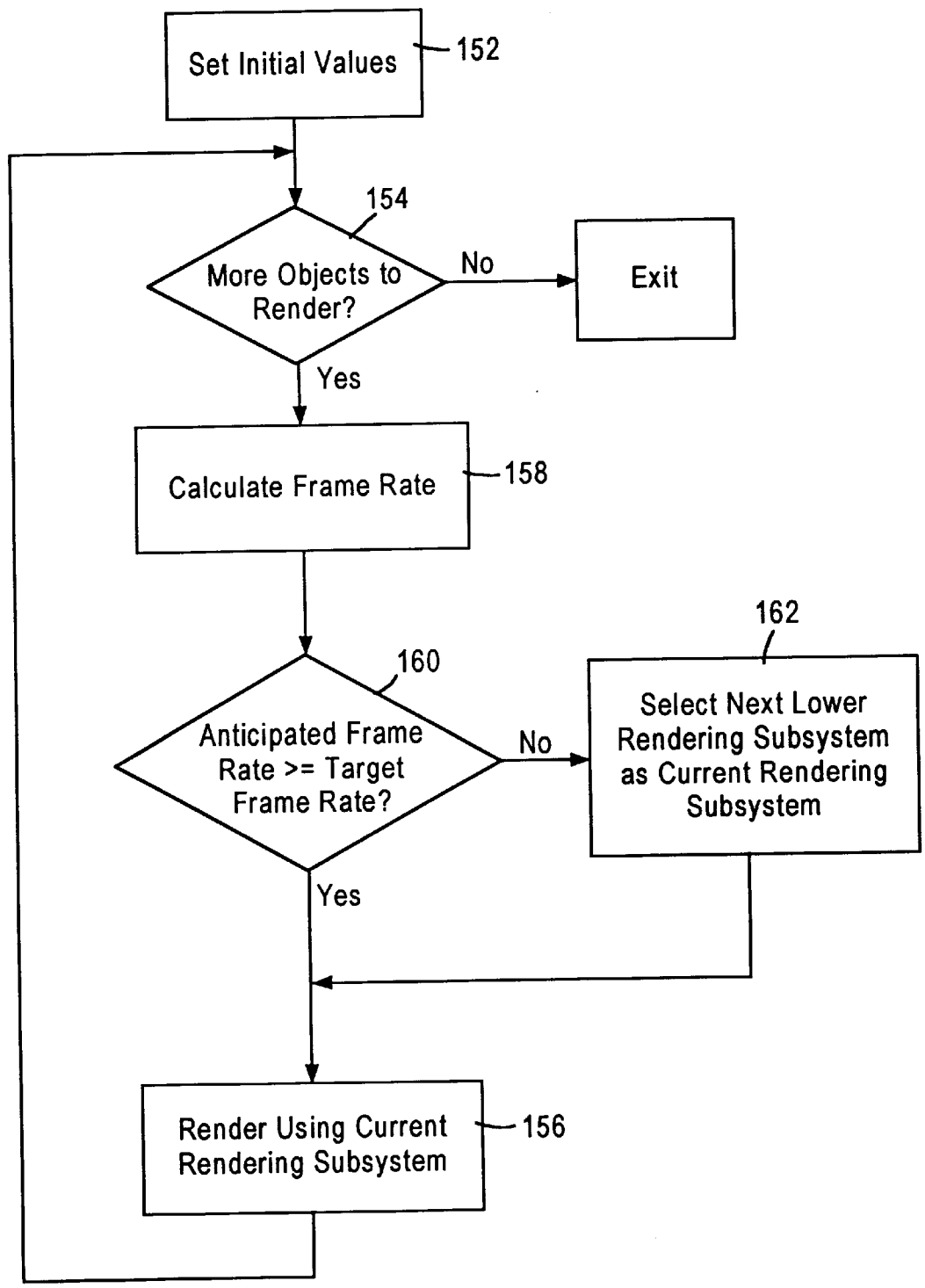
FIG. 2d is a flowchart showing the operation of an alternative embodiment of the adaptive degradation system of the present invention

In an alternative embodiment of the invention, illustrated in flow chart 151 in FIG. 2d, step 156 is postponed until after step 160. The time required to render the scene is predicted by the systems by summing the elapsed time for rendering each of the objects in the scene from the prior frame. The rendering subsystem to be used (106a–106g) is then selected based on the anticipated rendering time for the current frame which is assumed to be the same as the time consumed in rendering the previous frame. The rendering takes place in step 156 using the selection made in steps 160 and 162.

Figure 3A:
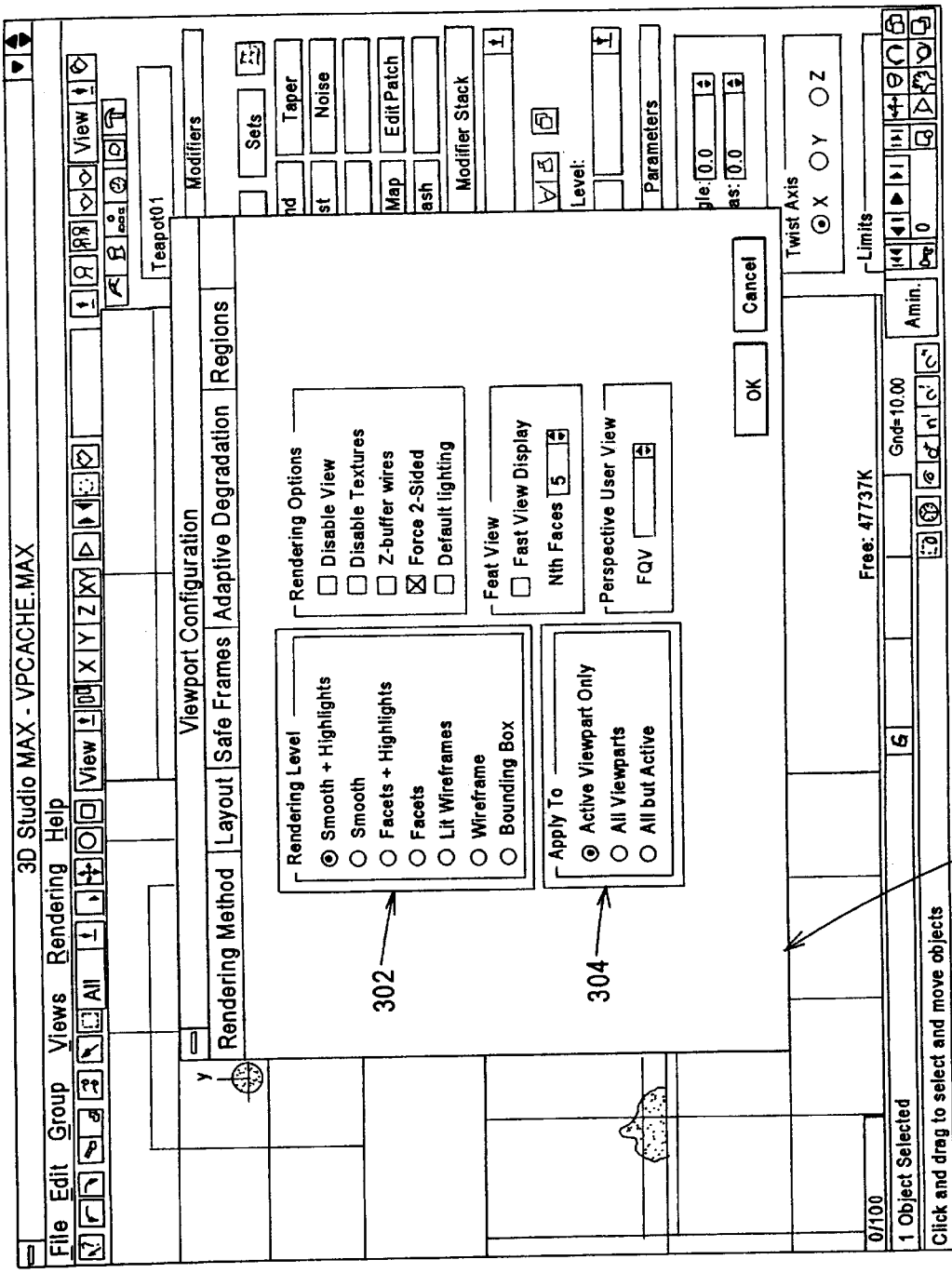
FIG. 3a is an example of a screen showing the various rendering options available to the user for rendering a scene.
Figure 3B:
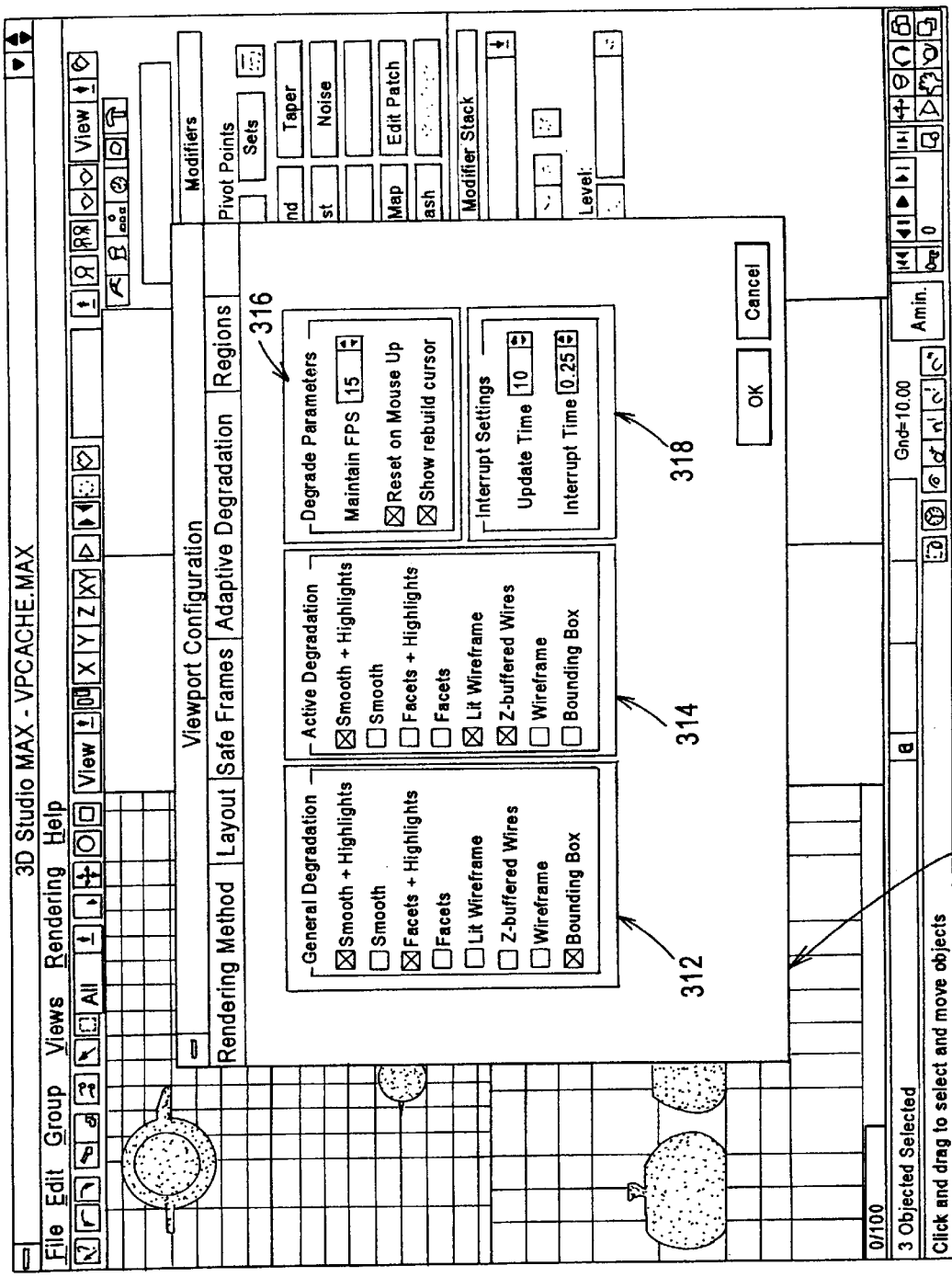
FIG. 3b is an example of a screen showing the options available to the user in setting the parameters used by the system to control the level of degradation of the rendering of the scene.

During the initialization step 152 the user may adjust one or more parameters which control the operation of the system. Default values for the parameters in step 152 are provided at startup. FIG. 3a shows a typical set-up screen 300 used to select the general rendering level of the scene. Using the rendering level selection box 302 the user sets the general rendering method. The user makes a single selection in selection box 302. The user can further select to restrict the rendering option to one of the active viewports or to apply to all the viewports on the screen by selecting the appropriate option in selection box 304. In FIG. 3a, the user has selected as the general level the highest level rendering available by this system, specifically the smooth rendering of the sides plus the application of highlights caused by the scene's lighting.

During the initialization step 152, the user may use degradation selection boxes 312 and 314 from the adaptive degradation screen 310 (FIG. 3b) to select, from a palette of available subsystems (106a–106g), the rendering subsystems which may be used by the rendering system 106 to render the scene. The rendering subsystems are arranged in selection box 302, 312 and 314 in descending order of computational complexity. The user may select one or more rendering subsystems in selection boxes 312 and 314. Selection box 312 selects the rendering subsystems used by all the non-active viewports. Selection box 314 is used to select the rendering subsystems used by the rendering system 106 to render the scene in the active viewport only. The distinction between active and non-active viewports will be discussed in detail in connection with FIGS. 4 and 5 below. Generally, when the system is displaying the scene in more than one viewport, the active viewport is the viewport most recently manipulated by the user.

Using option selection box 316, the user may also adjust the frame rate that is used in step 160 to initiate the degradation process in step 162.

Separate degradation options provide more flexibility in selecting the level of degradation acceptable to the designer. The active viewport is generally the focus of the manipulation of the objects and a different level of degradation may be tolerable by the designer in that viewport than in other views of the scene displayed in the non-active viewports. In addition, since the active viewport receives its share of the rendering time first, the active viewport will maintain the highest degree of rendering quality among the several viewports.

As seen in the selection box 316, a dialogue box and appropriate controls are provided to permit the user to select the desired refresh rate of the screen in units of frames per second ("FPS"). The user has the option of selecting a mouse up event as the point where the degradation is terminated and the scene is re-rendered using the selected rendering method as well as the ability to show an interim or rebuilding cursor to inform the designer that a rendering operation is under way.

Other settings located on screen 310 are the Interrupt Settings parameters in option selection box 318. The user may select an update time using the controls located in option selection box 318. The update time setting permits the user to specify a period of time in seconds and fractions of a second. If rendering the scene requires more time than specified in the update time parameter, the screen is updated at intervals equal to the update time setting. For example, if the scene requires ten seconds to render, and the update time setting is set at one second, after the passage of each second of processing time the partial results of the rendering operation are merged with the existing image on the screen. This option permits the user to see the interim results of rendering operations requiring long periods of time to complete. If necessary, the operation can be interrupted without having to wait for it to complete.

The second parameter located in option selection box 318 is the interrupt time setting which specifies the frequency at which the system accepts inputs or possible interruptions from the designer. The setting shown in FIG. 3*b* for interrupt time is 0.25 which specifies that while the system is busy rendering the scene every one quarter of a second the system checks for input from the user to permit the user to change the parameters or the interrupt operation in progress. Typically, the interrupt detection process controlled by option selection box 318 is a computational thread or process running independently of the rendering system 106. The user may change any of the settings contained on the adaptive degradation screen 310 at any time during the operation of the system, however default values are provided at the initial start-up of the system for the user's convenience.

The operation of the adaptive degradation feature of the preferred embodiment of the adaptive degradations system is further illustrated by the pseudo code contained in FIG. 6. The initialization step 152 may involve performing the functions listed under the heading Initialize Adaptive Degradation in FIG. 6. As shown by the pseudo code sequence in FIG. 6, the adaptive degradation system begins by setting the current rendering level to the general rendering level selected in options selection screen 302. The system then resets the rendering interval timer to the value specified in the update time value in option selection box 318 and resets an interrupt timer to the value set in the interrupt time parameter of the option selection box 318.

For each object in the scene the system calculates the time required to render that object using the current rendering level based on prior rendering of the same object. If, based on the frame rate selected in the "maintain FPS" parameter set in options selection box 316, enough time is available to render the object at the current rendering level, the object is rendered using the current rendering level. If insufficient time remains, and if the reset on mouse up option is selected in options selection box 316 then the system reduces the current rendering level of the viewport being rendered to the next rendering level set in options selection box 314 (for the active viewport) or 312 (for non-active viewports). If the reset on mouse up parameter is not selected by the user, then the system reduces the current rendering level to the lowest rendering level selected by adaptive degradation system in rendering the last frame of the scene.

If the time used to render the scene has exceeded the update time specified in the "update time" option set in option selection box 318, then the system updates the screen with the rendering results available at that time and the rendering interval timer is reset by the system.

Simultaneously with checking the rendering interval timer, the system also checks if the interrupt timer has equaled or exceeded the values set in the "interrupt time" parameter set in option selection box 318. If the interrupt time has been equaled or exceeded, the system enables interruptions to the rendering process for a certain period of time to permit the user to interrupt the rendering process and then disables the interruptions and proceeds to rendering the next portion of the current object and repeats the steps outlined above until every object in the scene has been rendered.

The adaptive degradation system provides the additional advantage to the designer that it responds automatically to any computational load that causes the frame rate to drop. The system is not limited to responding to loads imposed on the computer by the design system alone, but background tasks or the computational requirements of other programs running in a multi-tasking or multi-threaded environment will trigger the adaptive degradations system automatically, if their requirements for computer resources cause a reduction in the system's frame rate. Examples of such processes include Electronic Mail programs, index and search programs, communication programs, data base access programs, etc. which are running concurrently with the design system.

The scene is initially rendered using the general rendering method selected in option selection box 312. When the scene is manipulated or animated causing the frame rate to fall below the value specified by the designer, the system automatically reduces the scene's rendering quality by selecting the next lower quality rendering subsystem (106*a* through 106*g*) selected in the option selection boxes 312 and 314 until the frame rate specified by the designer is achieved or the selected object or objects are rendered using the rendering subsystem showing the lowest level of detail. When the actions that caused the reduction of the frame rate, such as object manipulation, or increased computational load due to the activation of background tasks are terminated, the rendering quality is returned to the general rendering method.

At any stage of the process, the designer may choose to override the adaptive degradation system and force the system to render the scene using the general rendering technique. When the override is in effect, the refresh rate may fall below the selected refresh rate. When the designer removes the override, the adaptive degradation system resumes operation.

FIGS. 4*a* through 4*d* illustrate the user's view of the adaptive degradation system of the present invention.

Figure 4A:
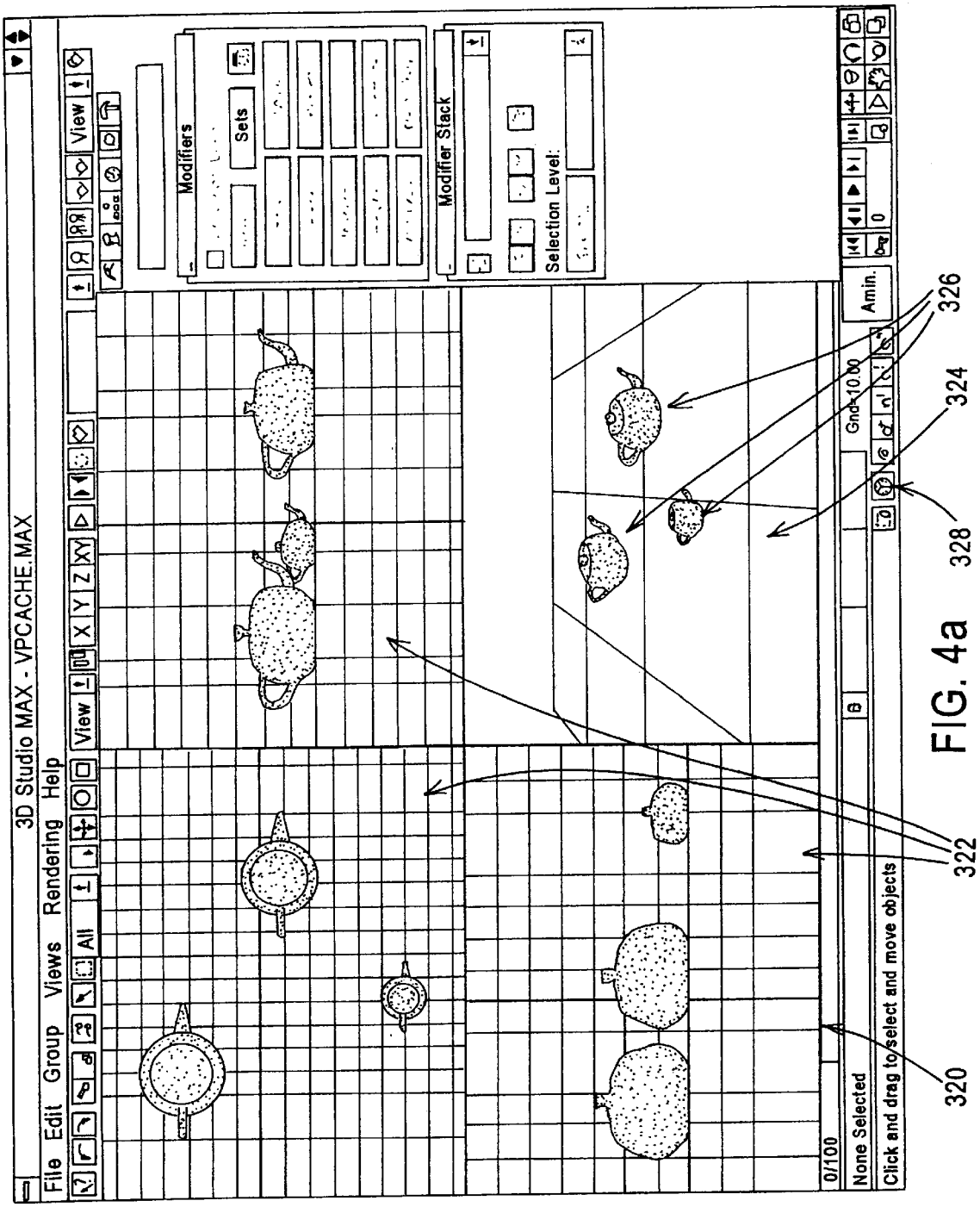
FIGS. 4a–4d illustrates the operation of the adaptive degradation system as part of a three-dimensional designer rendering package.

In FIG. 4*a,* the viewport screen 320 is divided into 4 viewports: the active viewport 324 and non-active viewports 322. The configuration is illustrative, and numerous other configuration of viewports are possible and selectable by the user. The viewports display, from varying perspective, the same three dimensional objects 326. The degradation override feature 328 is not engaged, therefore the adaptive degradation system is in operation.

Figure 4B:
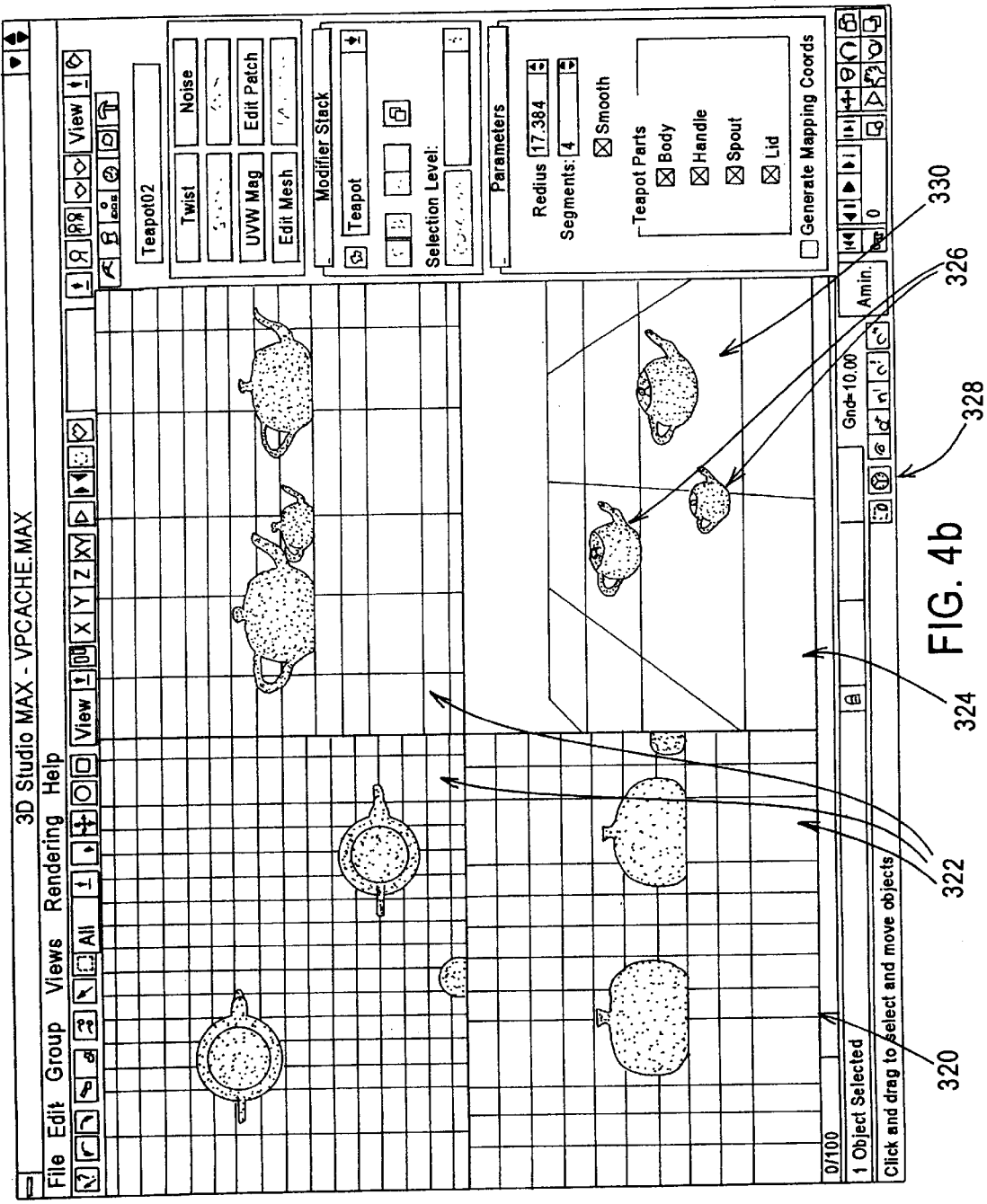

In FIG. 4*b,* in the active viewport 324, one object 330 is selected for manipulation. The selected object is superimposed with a selection box in all viewports (322, 324).

Figure 4C:
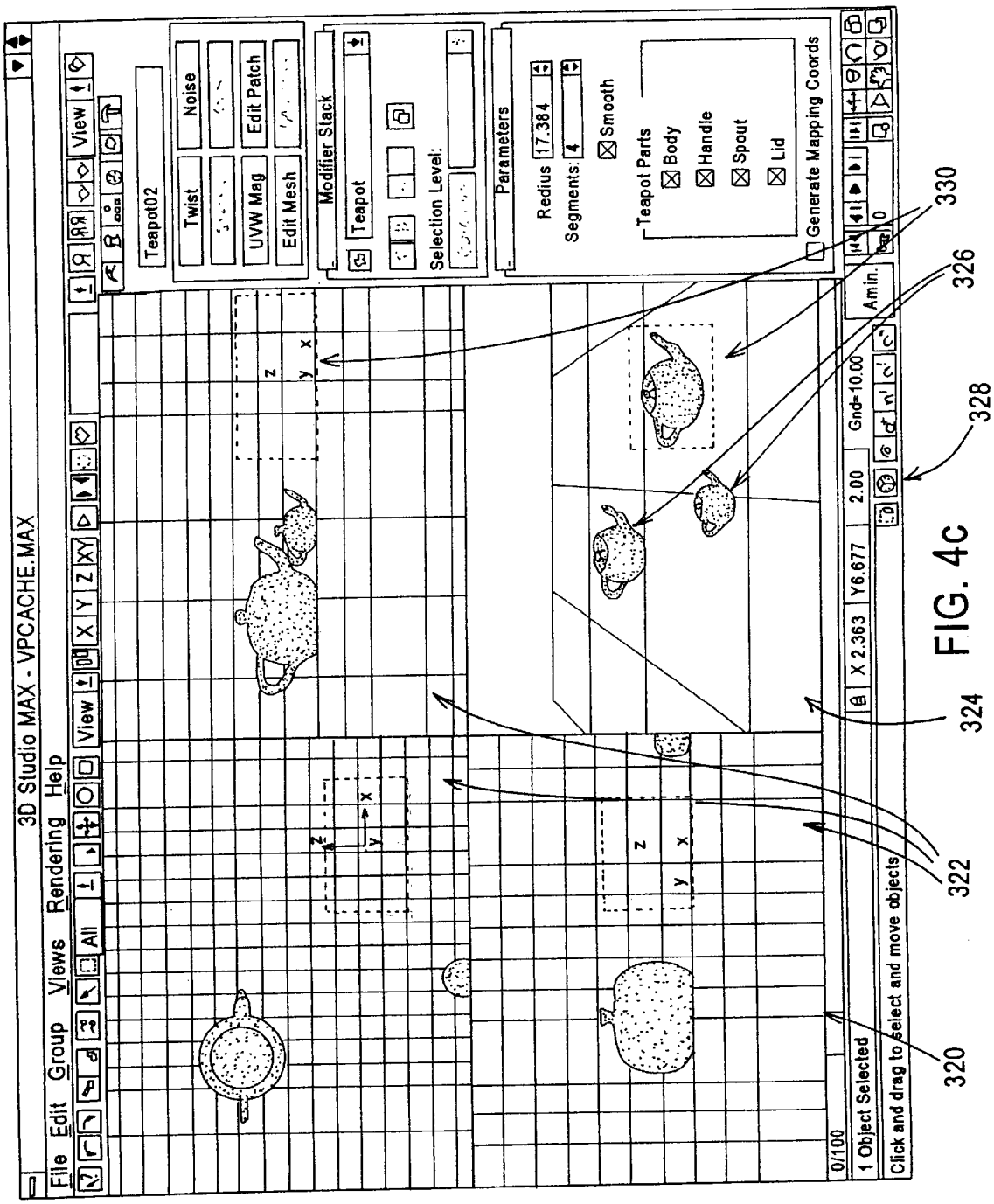

In FIG. 4*c,* the selected object 330 is manipulated by the user, and the adaptive degradation system is triggered. The selected object 330 is no longer displayed as smooth shaded with lighting highlights as in FIG. 4*b,* but is now shown rendered as a lit wireframe in the active viewport 326, and as a bounding box in the non-active viewports 322. The non-selected objects 324, are displayed rendered at their original rendering level.

Figure 4D:
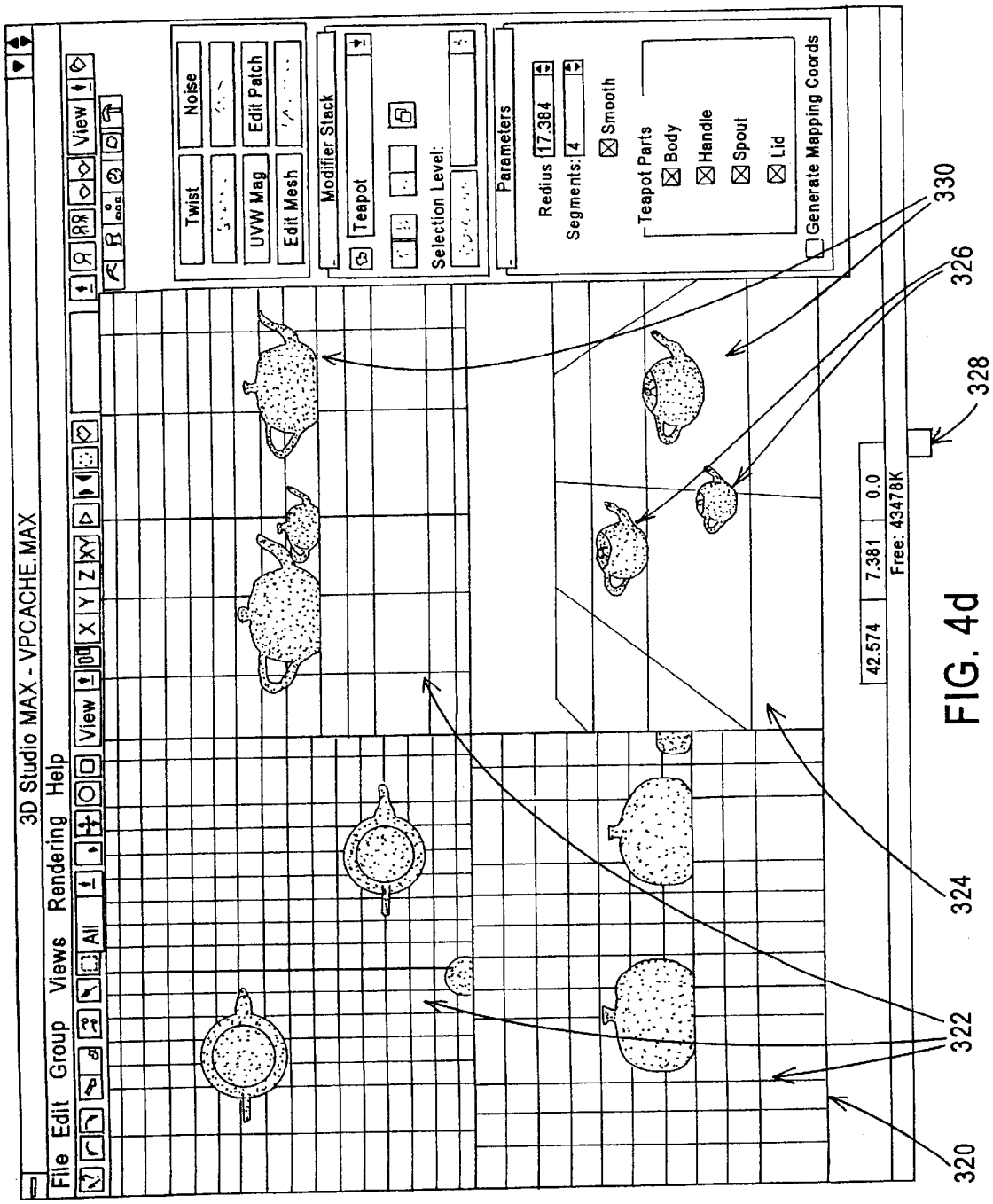

In FIG. 4*d,* the manipulation of the selected object 330 is complete. The selected object is rendered using the general rendering level selected in option selection box 302, in both the active viewport 324 and the non-active viewports 322.

FIGS. 5*a* through 5*e* illustrate another example of the user's view of the adaptive degradation system of the present invention.

Figure 5A:
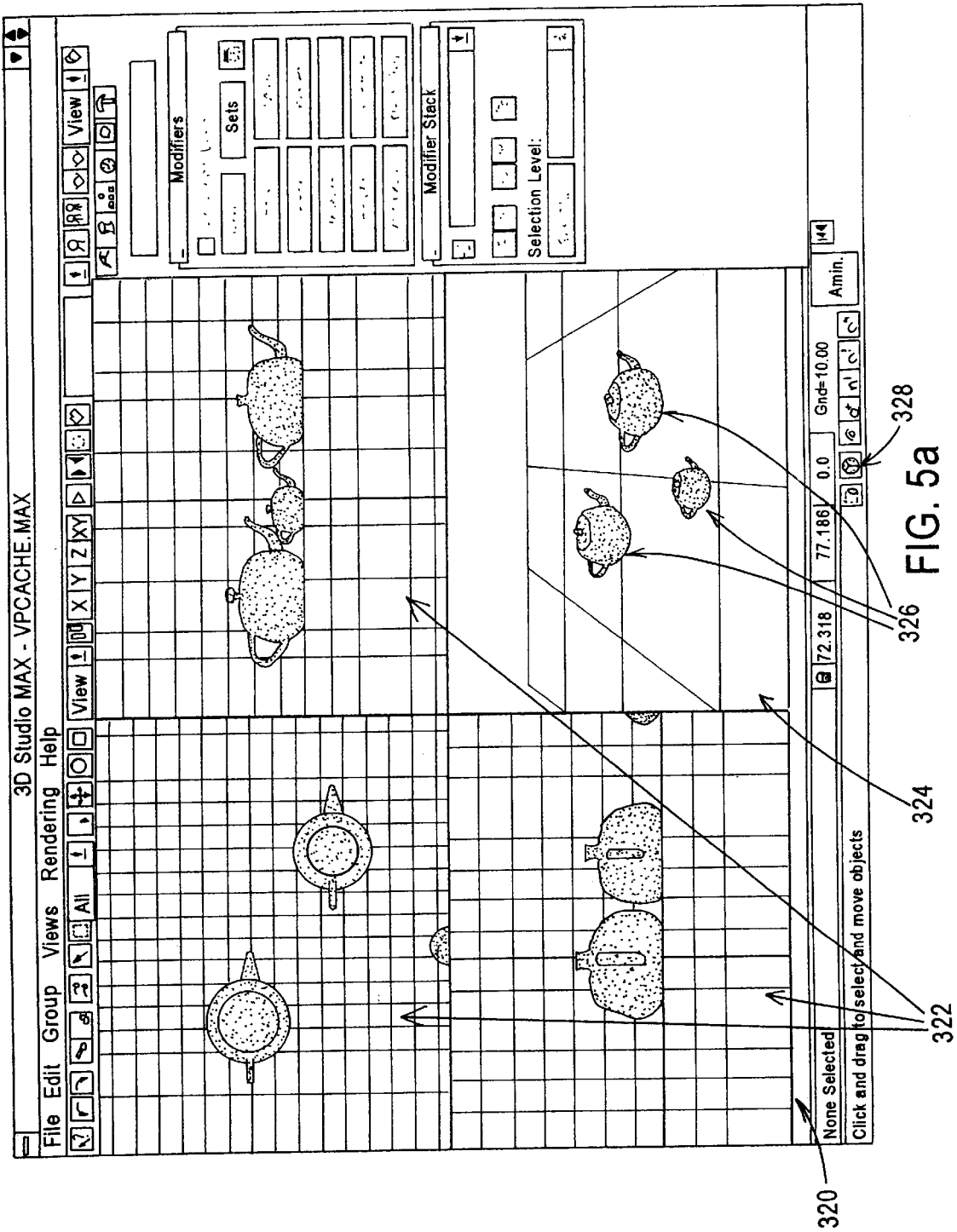
FIGS. 5a–5e illustrates multilevel degradation of the rendering of objects in a scene with the adaptive degradation system of this invention as part of a three-dimensional design and rendering package.

In FIG. 5*a,* the viewport screen 320 is divided into 4 viewports: the active viewport 324 and non-active viewports 322. The configuration is illustrative, and numerous other configuration of viewports are possible and selectable by the user. The viewports display, from varying perspectives, the same three dimensional objects 326. The degradation override feature 328 is not engaged, therefore the adaptive degradation system is in operation.

Figure 5B:
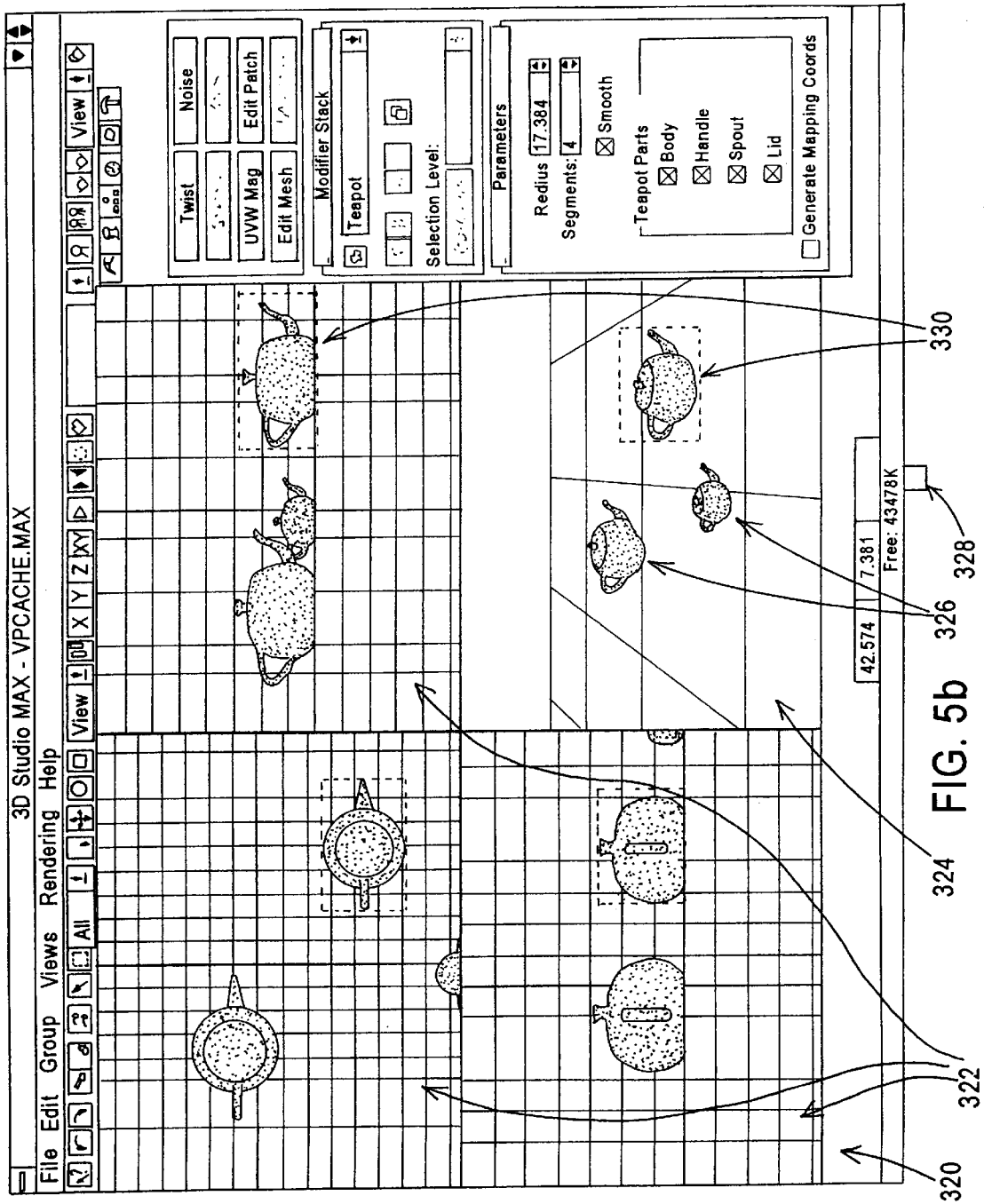

In FIG. 5b, in the active viewport 324, object 330 is selected for manipulation 330. The selected object 330 is superimposed with a selection box in all viewports (322, 324).

Figure 5C:
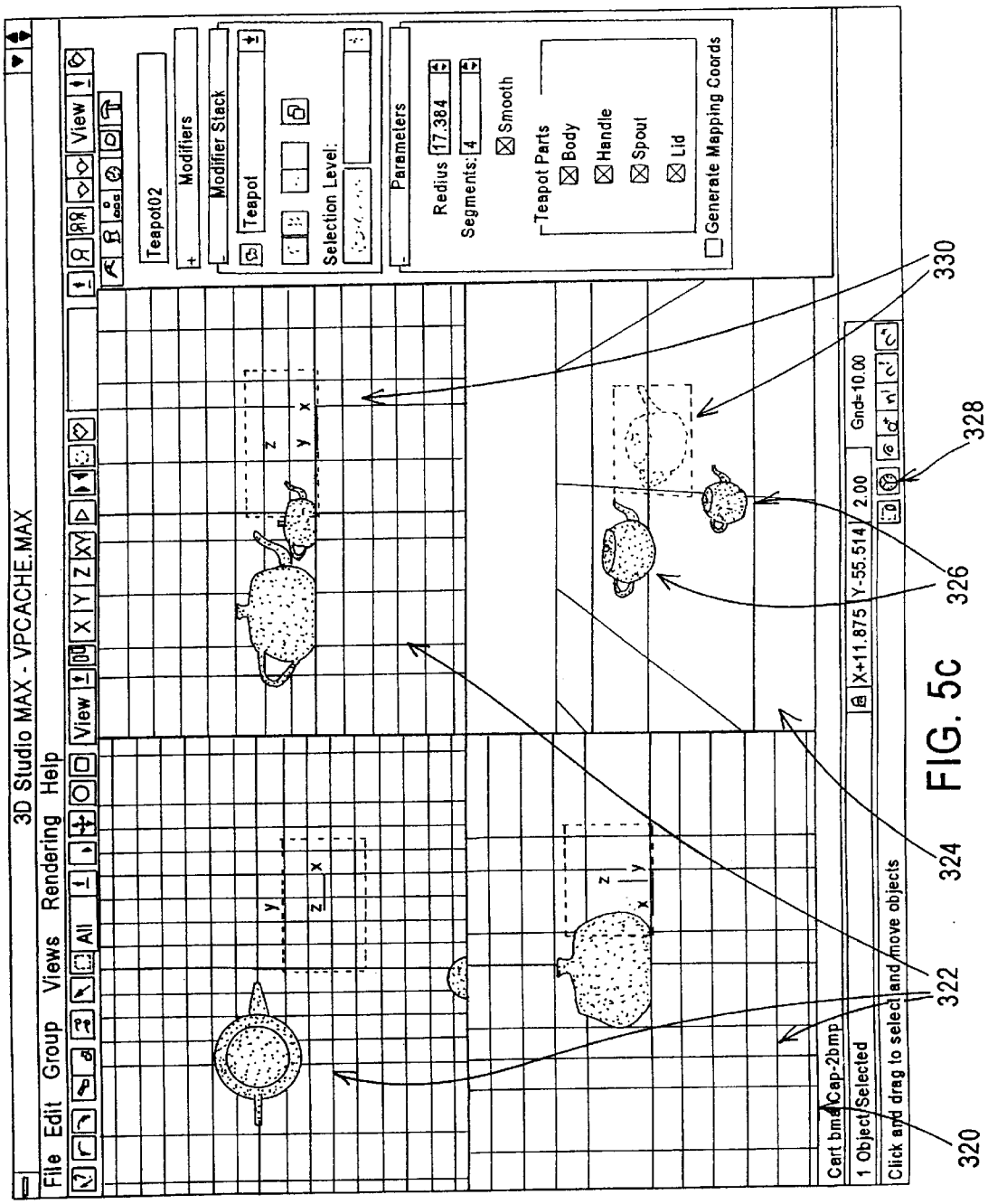

In FIG. 5c, the selected object 330 is manipulated by the user, and the adaptive degradation system reduces the rendering quality of the selected object. The selected object 330 is no longer displayed as smooth shaded with lighting highlights as in FIG. 5b, but is now shown rendered as a lit wireframe in the active viewport 324, and as a bounding box in the non-active viewports 322. The non-selected objects 326, are displayed rendered at their original rendering level.

Figure 5D:
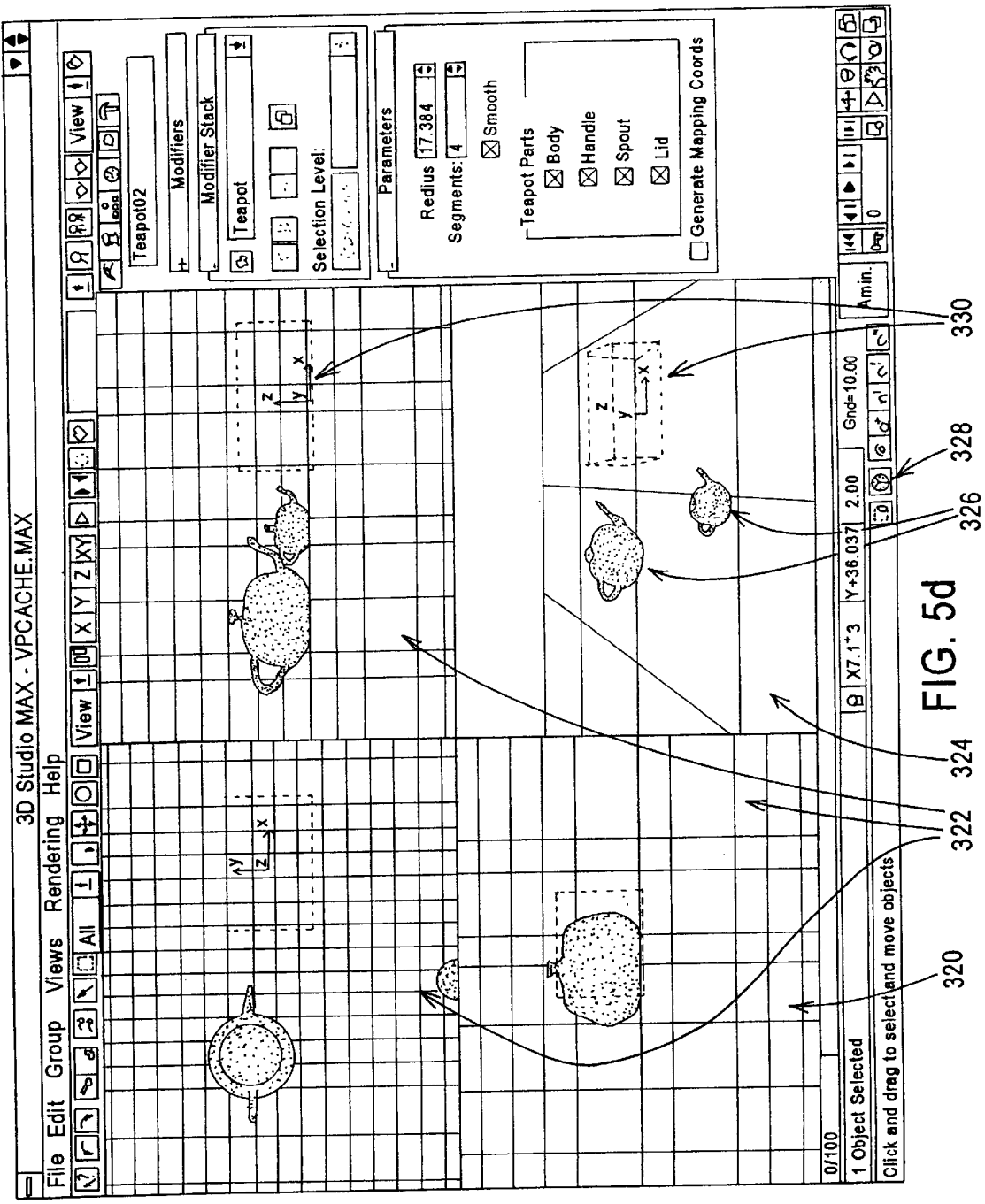

In FIG. 5d, the selected object 330 is further manipulated by the user, and the adaptive degradation system further reduces the rendering quality of the selected object. The selected object 330 is no longer displayed as a lit wireframe in the active viewport as in FIG. 5c, but is now shown rendered as a bounding box in both the active viewport 324 and the non-active viewports 322. The non-selected objects 326, are displayed rendered at their original rendering level.

Figure 5E:
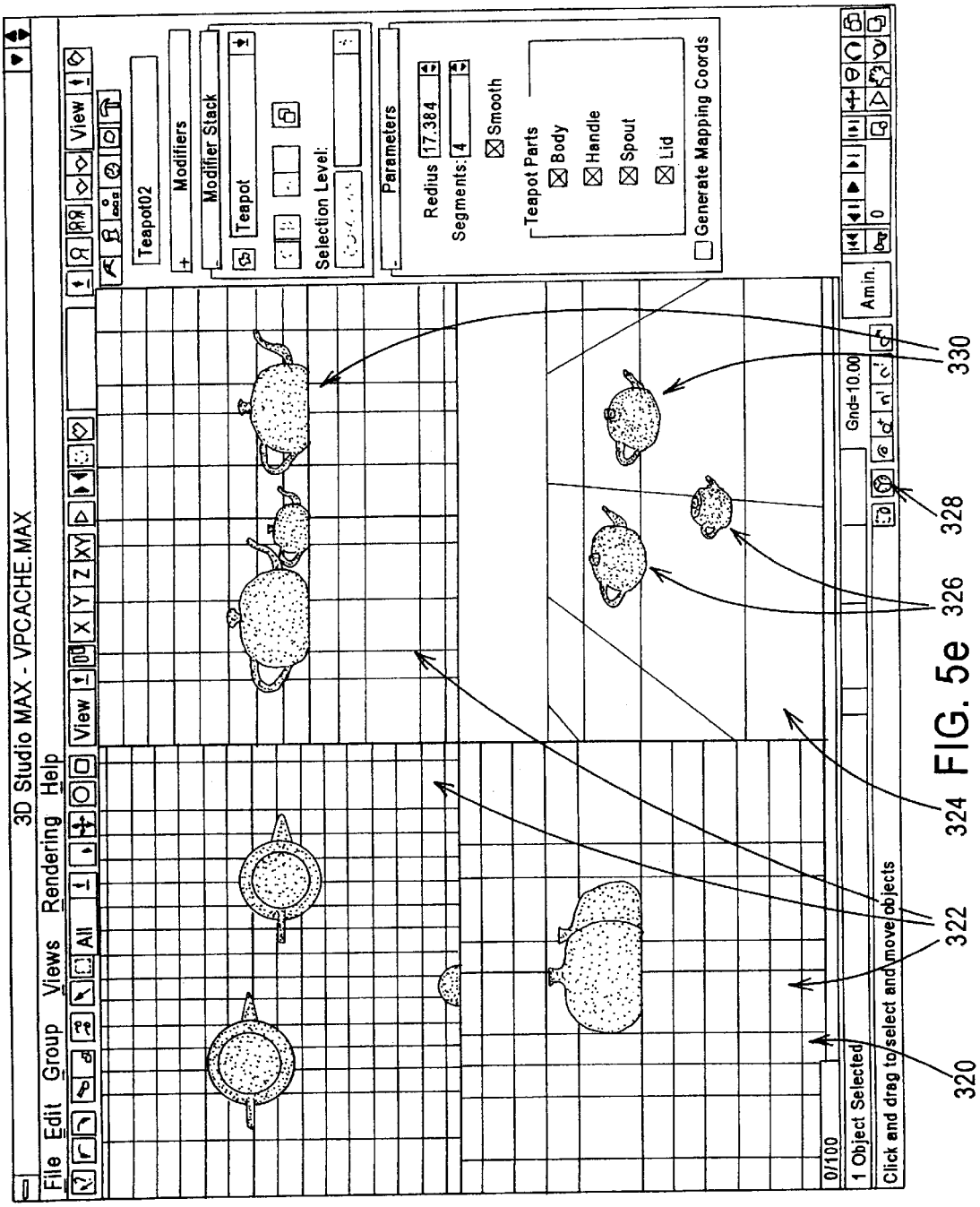

In FIG. 5e, the manipulation of the selected object 330 is complete. The selected object is rendered using the general rendering level selected in option selection box 302, in both the active viewport 324 and the non-active viewports 322.

While the foregoing invention has been described in reference to its preferred embodiments, it should be understood that various modifications and alterations will occur to those practiced in the art. Such modifications and alterations are intended to fall within the scope of the appended claims.

What is claimed is:

1. An adaptive degradation system for selectively degrading quality of rendering a scene, comprising:
    a rendering module containing a plurality of submodules each capable of rendering said scene at a different quality level;
    means for monitoring a rate of rendering said scene by said rendering module, each of said plurality of submodules having a different rate of rendering said scene; and
    means for, during rendition of the scene, after rendering a first object in the scene using a first submodule associated with a first quality level, automatically selecting a second submodule to render a second object in the scene such that said rate of entirely rendering the scene is above a predetermined rate, wherein the second submodule is associated with a second quality level that is different from said first quality level.

2. A method for selectively varying presentation quality of a scene that is displayed by a three dimensional rendering system, the method comprising the steps of:
    receiving a display rate value that represents a rate of displaying the scene; and
    while rendering the scene, automatically adjusting the presentation quality of objects in the scene based on the display rate value and how much time has already elapsed rendering the scene.

3. The method recited in claim 2, in which automatically adjusting the presentation quality comprises:
    selecting one of a plurality of detailed rendering levels based on the display rate value and a current computational load on the three dimensional rendering system; and
    rendering an object according to the selected one of the rendering levels.

4. The method recited in claim 3, wherein:
    the three dimensional rendering system supports a set of detailed rendering levels;
    the method includes the step of receiving user input that selects a subset of the set of detailed rendering levels; and
    the step of selecting one of a plurality of detailed rendering levels is performed by selecting a detailed rendering level from the subset of detailed rendering levels.

5. The method recited in claim 4, in which selecting one of the rendering levels comprises selecting one of the rendering levels that is associated with a more highly detailed rendering level when the computation load on the three dimensional rendering system decreases.

6. The method recited in claim 4, in which selecting one of the rendering levels comprises selecting one of the rendering levels that is associated with a less detailed rendering level when the computation load on the three dimensional rendering system increases.

7. The method of claim 2, further comprising the step of generating one or more computation load values that indicates a degradation or improvement in computational complexity of the scene.

8. The method of claim 2, wherein receiving a display rate value comprises receiving a refresh frame rate value.

9. A method for selectively varying presentation quality of a scene that is displayed by a three dimensional rendering system, the method comprising the steps of:
    receiving user input that selects a subset of presentation quality values from a plurality of presentation quality values, wherein each of the plurality of presentation quality values is associated with one of a plurality of rendering levels that can be used by the three-dimensional rendering system to render objects;
    receiving a refresh frame rate value that represents a rate of refreshing a display of the scene;
    while rendering the scene, automatically selecting a rendering level, from the rendering levels that correspond to the selected subset of presentation quality values, based on the refresh frame rate value; and
    rendering an object of the scene in the display at a rendering level that is associated with the selected presentation quality value.

10. The method recited in claim 9, wherein:
    the plurality of rendering levels includes a first rendering level, a second rendering level, and a third rendering level;
    the first rendering level is associated with a higher presentation quality than said second and third rendering levels;
    the second render level is associated with a higher presentation quality than said third rendering level;
    the first and third rendering levels are associated with presentation quality values that are selected by the user input;
    the second rendering level is associated with a presentation quality value that is not selected by the user input;
    the step of automatically selecting a rendering level is performed for said object after another object in the scene has been rendered at said first rendering level; and
    the step of automatically selecting a rendering level is performed by selecting the third rendering level for rendering the object, without considering said second rendering level, upon determining that the scene cannot be fully rendered at the first rendering level consistent with said rate of refreshing.

11. The method recited in claim 9, in which selecting one of the rendering levels comprises selecting one of the rendering levels that is associated with a less detailed rendering level when the computational load on the three-dimensional rendering system increases.

12. An adaptive rendering apparatus, comprising:

one or more processors;

a rendering system that causes the apparatus to render three dimensional objects within a scene in a display at one of a plurality of successively less detailed rendering levels;

at least one control for receiving user input that selects presentation quality values from a set of available presentation quality values, wherein each presentation quality value is associated with one of the rendering levels; and an adaptive degradation controller comprising one or more sequences of instructions which, when executed by the one or more processors, cause the apparatus to carry out the steps of:

receiving a display rate value that represents a rate at which the rendering system is to display the scene; and while rendering the scene, modifying presentation quality of the objects within said scene based on the display rate value and the selected presentation quality values, wherein at least a first object in the scene is rendered at a rendering level associated with a first selected presentation quality value and at least a second object in the scene is rendered at a rendering level associated with a second selected presentation quality value.

13. The apparatus recited in claim 12, in which the instructions that cause the apparatus to carry out modifying presentation quality further comprise instructions which, when executed by the one or more processors, cause the apparatus to carry out:

selecting one of the rendering levels that is associated with a more highly detailed rendering level when the computation load on the rendering system decreases; and rendering an object with the rendering system using the selected rendering level.

14. The apparatus recited in claim 12, in which the instructions that cause the apparatus to carry out modifying presentation quality further comprise instructions which, when executed by the one or more processors, cause the apparatus to carry out:

selecting one of the rendering levels that is associated with a less detailed rendering level when the computation load on the rendering system increases; and rendering an object with the rendering system using the selected rendering level.

15. The apparatus recited in claim 12, in which the adaptive degradation controller comprises one or more sequences of instructions which, when executed by the one or more processors, cause the apparatus to carry out the steps of:

receiving a refresh frame rate value that represents a rate of refreshing the object in the display;

selecting one of the rendering levels based on the refresh frame rate value; and modifying presentation quality of an object based on the display rate value and the presentation quality value.

16. The apparatus recited in claim 15, in which the instructions that cause the apparatus to carry out modifying presentation quality further comprise instructions which, when executed by the one or more processors, cause the apparatus to carry out:

selecting one of the rendering levels that is associated with a less detailed rendering level when the computation load on the rendering system increases; and rendering the object with the rendering system using the selected rendering level.

17. The apparatus recited in claim 12, wherein the rendering system further comprises a plurality of rendering subsystems, in which each rendering subsystem causes the apparatus to render the object in the display at one of a plurality of successively less detailed rendering levels.

18. The apparatus recited in claim 17, in which the instructions that cause the apparatus to carry out modifying presentation quality further comprise instructions which, when executed by the one or more processors, cause the apparatus to carry out:

selecting one of the rendering subsystems that is associated with a more highly detailed rendering level when the computation load on the rendering system decreases; and rendering the object with the selected rendering subsystem.

19. The apparatus recited in claim 17, in which the instructions that cause the apparatus to carry out modifying presentation quality further comprise instructions which, when executed by the one or more processors, cause the apparatus to carry out:

selecting one of the rendering subsystems that is associated with a less detailed rendering level when the computation load on the rendering system increases; and rendering the object with the selected rendering subsystem.

* * * * *